Aug. 25, 1953     W. STELZER     2,649,692
MASTER CYLINDER FOR HYDRAULIC BRAKING SYSTEMS
Filed Jan. 9, 1950
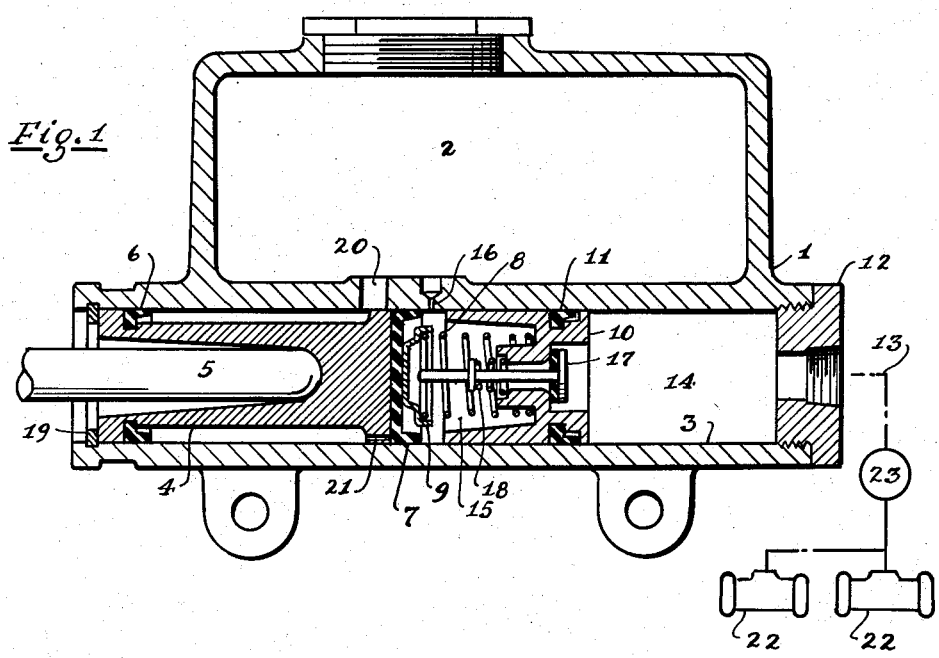
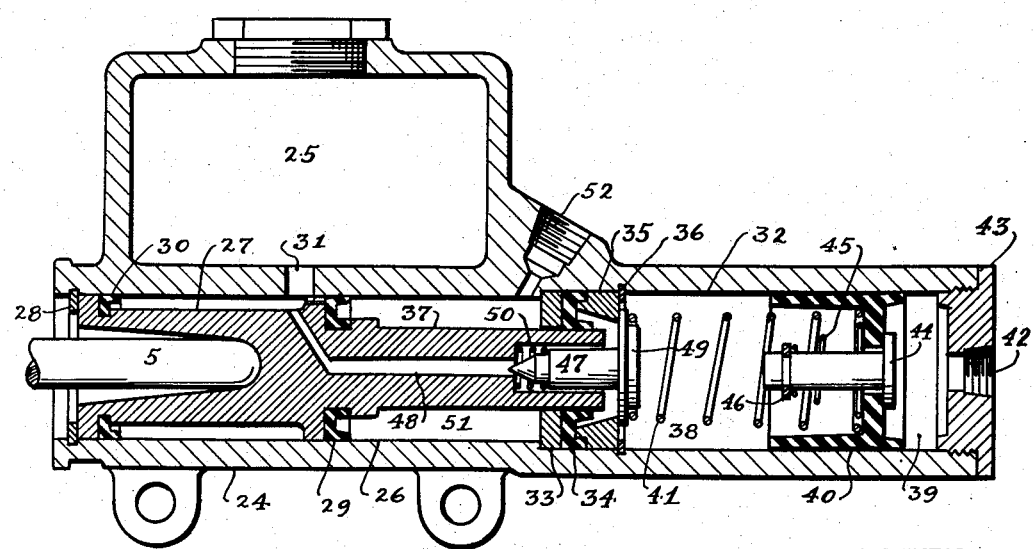
INVENTOR.
William Stelzer Patented Aug. 25, 1953

2,649,692

UNITED STATES PATENT OFFICE 2,649,692

MASTER CYLINDER FOR HYDRAULIC BRAKING SYSTEMS

William Stelzer, Summit, N. J.

Application January 9, 1950, Serial No. 137,502

5 Claims. (Cl. 60—54.6)

1

The invention relates to hydraulic braking systems and more particularly to a mechanism for maintaining a residual pressure in hydraulic braking systems.

It is a generally accepted practice to maintain a certain residual pressure in the brake lines and wheel cylinders of present day braking systems of automotive vehicles to prevent the admission of air into the hydraulic circuit. This is usually accomplished by a residual pressure valve located inside of the master cylinder and yieldingly urged into a closed position by the return spring of the master cylinder piston. The force of the spring prevents the return of hydraulic fluid to the master cylinder below a certain pressure, while a check valve permits the flow of fluid from the master cylinder to the wheel cylinders when the operator depresses the pedal. While it may appear that such residual valves have given a satisfactory performance in the past, the continuous demand for improved pedal feel and smaller manual effort have made the construction objectionable. With each brake application the return spring has to be compressed by manual effort without adding any useful work. Furthermore, in view of the thermal expansion of the brake fluid it is obvious that when the fluid in the brake lines has cooled off the residual pressure is lost.

The object of my invention is to eliminate the residual valve to be replaced by a spring actuated auxiliary piston to yieldingly oppose the return of hydraulic fluid from the lines to the master cylinder, whereby contraction of the fluid due to cooling would merely cause the piston to move to maintain the residual pressure.

Another object is to use the spring which actuates the auxiliary piston as a return spring for the master cylinder piston so that no work is lost, the force exerted by the spring being added to increase the hydraulic pressure to apply the brakes. Thus the manual effort is reduced. This is especially important where a power operated booster is employed, where the power cut-in takes place after a certain pressure is reached. It has been the aim to build boosters that go into operation when the hydraulic pressure produced by the master cylinder is still low, but for practical reasons the pressure where the cut-in takes place must be substantially above residual pressure. The manual effort relative to the wheel cylinder pressure is high in the first stage and relatively lower in the second stage during the assistance of the booster. Thus the reduction of the effort in the first or manual

2 stage is in effect the same as a lowering of the booster cut-in or a reduction in difference of proportionate pedal feel between the first and second stage. The improvement benefits particularly such braking systems where a booster with a high booster ratio is used and where the manual work performed must be reduced due to shorter pedal travel or less pedal pressure.

A further object is to provide means whereby the auxiliary piston is arrested or adjusted at the end of its possible stroke and the flow of fluid in the desired direction is permitted.

Other objects and advantages of the invention will be apparent from the following description considered in connection with the accompanying drawing submitted for the purpose of illustration and not intended to define the scope of the invention, reference being had for that purpose to the subjoined claims. In the drawing, wherein similar reference characters refer to similar parts:

Fig. 1 is a cross-sectional view of a master cylinder constructed according to my invention; and Fig. 2, a cross-sectional view of a master cylinder of a modified construction applicable to two-stage systems or to volume follow-up systems.

Before explaining the present invention in detail it is to be understood that the invention is not limited in its application to the details of construction and arrangement of parts illustrated in the accompanying drawing, since the invention can be carried out in various ways. Also it is to be understood that the phraseology or terminology employed herein is for the purpose of description and not limitation.

Referring now to Fig. 1, there is shown a master cylinder comprising a body 1 with a fluid reservoir 2 and having a bore 3 in which slides a master cylinder piston 4 actuated by manual power by a push rod 5 which is connected to the brake pedal, not shown. Piston 4 has a secondary cup or seal 6 and a primary seal 7 held against the face of piston 4 by a spring 8 through the medium of a disc or cap 9, the other end of the spring engaging an auxiliary piston or residual pressure piston 10 slideable in bore 3 and provided with a seal 11. The end of bore 3 is closed with a plug 12 connected via brake line 13 to wheel cylinders 22 and a booster 23 may be interposed which is indicated diagrammatically. The residual pressure piston is shown in a position that it would assume in operation where the master cylinder is connected to the brake line and the fluid ahead of piston 10 in chamber 14 is locked, i. e., under residual pressure. The space between seal 7 and piston 10 is designated as chamber 15 which is open to reservoir 2 through a small port 16 when piston 4 is in the released or starting position. A check valve 17 urged into a seated position on piston 10 by a very light spring 18 serves to permit flow of fluid from the primary side of piston 10 to the secondary side, i. e., from chamber 15 to chamber 14, whenever the hydraulic pressure in the former is higher. The inside face of the poppet type check valve may be faced with rubber or other similar material to prevent any possible leakage. The stem of the valve is sufficiently long that it touches cap 9 before piston 10 covers port 16 in the retractile movement of piston 10 so that the forced opening of valve 17 prevents piston 10 from ever coming too close to seal 7. The valve seat in piston 10 is recessed to allow valve 17 to open when piston 10 is resting fully against plug 12, as would happen if the pressure in chamber 14 is lower than in chamber 15. The master cylinder is shown in the released or starting position, where piston 4 rests against snap ring 19. The space between seals 6 and 7 is open permanently to the reservoir through a hole 20. It is customary to provide holes 21 in piston 4 to facilitate the flow of fluid from the reservoir past cup 7 into chamber 15 should a suction exist in the latter.

The modification shown in Fig. 2 shows a master cylinder for a volume follow-up braking system as described and shown in my co-pending application Serial No. 137,501 filed January 9, 1950. A cylinder body 24 with the usual reservoir 25 has a bore 26 in which slides a compound piston 27 actuated by push rod 5, the piston being shown in the released or starting position where it rests against snap ring 28. Piston 27 has a primary seal 29 and a secondary seal 30, the space between the two being permanently in communication with reservoir 25 through hole 31. An enlarged bore 32 concentric with 26 provides a recess against which is secured a bearing 33, a seal 34, and a retaining sleeve 35, by means of an internal snap ring 36. Piston 27 comprises a smaller concentric plunger 37 arranged to slide through bearing 33 and seal 34 to enter into chamber 38 which is separated from chamber 39 by a residual pressure piston 40, preferably made of rubber, sliding in bore 32 and urged toward the right by a return spring 41 to resiliently maintain a pressure in chamber 39 connected through hole 42 of end plug 43 to the wheel cylinders, not shown. If the pressure in chamber 38 is higher than in chamber 39 fluid may flow from 38 to 39 past check valve 44 ordinarily urged into a seated position by a very light spring 45 acting against snap ring 46 on the stem of valve 44. Another valve in the shape of a needle valve 47 is provided in plunger 37 to close off passage 48 which is in communication with reservoir 25 through hole 31. When piston 27 is in the released position as shown, the valve is unseated as its recessed flange 49 rests against sleeve 35 so that communication is established in this position between chamber 38 and reservoir 25. Spring 41 is seated on the recessed part of flange 49 to urge valve 47 into a closed position, opposed by a subordinate or weaker spring 50 whose function is to force piston 27 fully against snap ring 28 after flange 49 of valve 47 is arrested by sleeve 35. As explained fully in my co-pending application, chambers 38 and 39 in operation are subject to a high pressure generated by plunger 37, while chamber 51 between seal 29 and bearing 33 is subjected only to a very low pressure sufficient to operate the valve mechanism of the booster to which chamber 51 is connected through tapped hole 52.

In operation, depression of the brake pedal to move push rod 5 and piston 4 of Fig. 1 toward the right, port 16 is first closed as seal 7 passes it, and then a pressure is produced in chambers 15 and 14 and fluid is displaced to be transmitted to the wheel cylinders to apply the brakes. The pressure in chamber 14 remains slightly higher than in 15 as induced by spring 8. No transfer of fluid takes place between the two chambers so pistons 10 and 4 move simultaneously and in unison. If piston 10 at the start of the stroke was relatively close to plug 12, and during the operation moves into contact with it, any further travel of piston 4 to transmit more fluid to the wheel cylinders causes a higher pressure in chamber 15 and forces valve 17 to open, allowing fluid to pass to the secondary side of piston 10. A release of piston 4 to reduce the pressure in chamber 15 would immediately close valve 17 due to spring 18, and in the retractile movement piston 10 again follows piston 4, but in an adjusted position. Assuming now that the master cylinder is again in the starting or released position and that due to expansion of the brake fluid in the wheel cylinders or lines piston 10 is moved toward the left whereby fluid is displaced from chamber 15 into reservoir 2 through port 16, before the skirt of piston 10 reaches port 16 the valve stem of check valve 17 touches cap 9 to momentarily open valve 17 to allow the relief of a small amount of fluid from chamber 14. It is thus seen that an automatic adjustment takes place in the extreme positions of residual pressure piston 10.

The operation of the modified master cylinder shown in Fig. 2 is in principle the same, but it will be noted that where bore 32 is larger in diameter than plunger 37, with a consequent shorter stroke of piston 40, only a fraction of the force of spring 41 is usefully employed to increase the pressure of the hydraulic brake fluid transmitted to the wheel cylinders. During the operating stroke spring 41 is compressed, and this work is of course lost. In the master cylinder in Fig. 1 this is not the case, because the working length of the spring remains constant unless some adjustment due to overtravel is required. To decrease the loss caused by depressing spring 41, it would be necessary to decrease the diameter of bore 32 whereby the travel of piston 40 would be increased. In the actuation of the master cylinder where piston 27 moves toward the right and plunger 37 enters into chamber 38 valve 47 becomes seated and a pressure is produced in chambers 38 and 39 to cause the displacement of fluid to the wheel cylinders through connection 42 to apply the brakes. Fluid is also displaced from chamber 51 to be transmitted to the booster to control the latter which transmits a certain amount of fluid under pressure to the wheel cylinders to augment the fluid transmitted from chamber 39. But this is not part of the present invention and therefore needs not to be further described. If piston 40 rests against plug 43, the fluid displaced by plunger 37 simply passes by check valve 44 to be transmitted to the wheel cylinders, and after the return stroke piston 40 assumes an adjusted position. This is particularly true in a new installation, or if a large amount of fluid had leaked from the wheel cylinders, the residual pressure piston would be urged against the end plug by the return spring, and in the first brake application adjustment would take place. The same thing applies to the construction in Fig. 1. If piston 40 in Fig. 2 is too close to plunger 37, the valve stem of valve 44 is picked up by flange 49 of valve 47 so that valve 44 is momentarily unseated to allow piston 40 to move in unison with plunger 37 or to prevent it from getting closer to the plunger. In the retractile movement of piston 27 when the brakes are released valve 47 is arrested at the end of its stroke when its flange 49 comes to rest against sleeve 35, spring 50 urging piston 27 against snap ring 28 so that valve 47 becomes opened and communication between chamber 38 and reservoir 25 is established.

I claim:

1. In a master cylinder for a hydraulic braking system having wheel cylinders to apply the brakes, a manually operable piston in said master cylinder to transmit fluid to said wheel cylinders, a residual pressure piston arranged to slide in said master cylinder ahead of said manually operable piston, spring means intermediate said residual pressure piston and said manually operated piston to bias said residual pressure piston in a brake applying direction to produce a slightly higher pressure in said wheel cylinders and to yieldingly urge said manually operated piston into the released position, a fluid reservoir, a check valve in said manually operable piston to facilitate the flow of fluid from said reservoir to the space intermediate said pistons, a stop to open said check valve in the released position of said manually operable piston, and check valve means to facilitate the flow of fluid from the primary side of said residual pressure piston to said wheel cylinders.

2. In a hydraulic braking system, a master cylinder comprising a pressure chamber, a manually operable piston sliding in said pressure chamber to increase the pressure therein, a residual pressure piston of rubberlike material slidable in said pressure chamber ahead of said manually operable piston, a spring intermediate said two pistons to urge them apart to produce a residual pressure ahead of said residual pressure piston and to yieldingly urge said manually operable piston into a released position, a check valve intermediate the two sides of said residual pressure piston arranged to check the flow of fluid ahead of said residual pressure piston to the space between said two pistons, a fluid reservoir, and check valve means to establish communication between said reservoir and the space between said pistons when said manually operable piston is in the starting position by unseating said check valve means.

3. The construction according to claim 2, and means to automatically open said check valve intermediate the two sides of said residual pressure piston when said pistons approach each other within a certain distance.

4. A master cylinder having a fluid reservoir, a low pressure chamber and a high pressure chamber, a manually operable stepped piston slidable in said chambers to produce a low pressure in said low pressure chamber and a high pressure in said high pressure chamber, a check valve in said stepped piston allowing fluid to flow from said reservoir to said high pressure chamber but not in the opposite direction, a residual pressure piston slidable in said high pressure chamber, a spring intermediate said stepped piston and said residual pressure piston to urge the latter to advance ahead of said stepped piston to produce a residual pressure, said spring reacting against said stepped piston to yieldingly urge it into a released position, and a check valve in said residual pressure piston arranged to permit flow of fluid ahead of said residual pressure piston and to check the flow in the opposite direction.

5. The construction as claimed in claim 4, where said residual pressure piston is made of a rubberlike material.

WILLIAM STELZER.

References Cited in the file of this patent

UNITED STATES PATENTS

| Number | Name | Date |
|---|---|---|
| 2,136,835 | Begg | Nov. 15, 1938 |
| 2,280,153 | Loweke | Apr. 21, 1942 |

FOREIGN PATENTS

| Number | Country | Date |
|---|---|---|
| 365,069 | Great Britain | Jan. 6, 1932 |
| 374,150 | Great Britain | June 6, 1932 |
| 389,930 | Great Britain | Mar. 30, 1933 |